Figure 1:
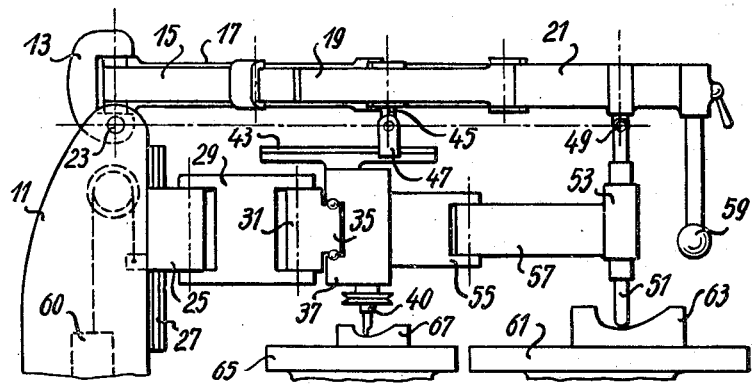

March 20, 1945.      K. ZWICK      2,371,941
COPYING MACHINE
Filed Jan. 9, 1942

Inventor
Kurt Zwick
By Cumpston & Shepard
his Attorneys

Patented Mar. 20, 1945

2,371,941

UNITED STATES PATENT OFFICE 2,371,941

COPYING MACHINE

Kurt Zwick, Munich, Germany; vested in the Alien Property Custodian

Application January 9, 1942, Serial No. 426,200 In Germany January 17, 1940

1 Claim. (Cl. 90—13.1)

The present invention relates to copying machines, using these words in a broad sense as including plane or two-dimensional machines, often called engraving machines, as well as relief or three-dimensional machines. An object of the invention is the provision of a generally improved and more satisfactory copying machine.

Another object is the provision of improved mechanism for supporting a parallel-motion beam of a copying machine.

A further object is the provision of a copying machine having a parallel-motion beam supported by what may be termed a single parallelogram, eliminating the need for a double parallelogram support and eliminating a cross-slide support.

To these and other ends the invention resides in certain improvements and combinations of parts, all as will be hereinafter more fully described, the novel features being pointed out in the claim at the end of the specification.

Figure 2:
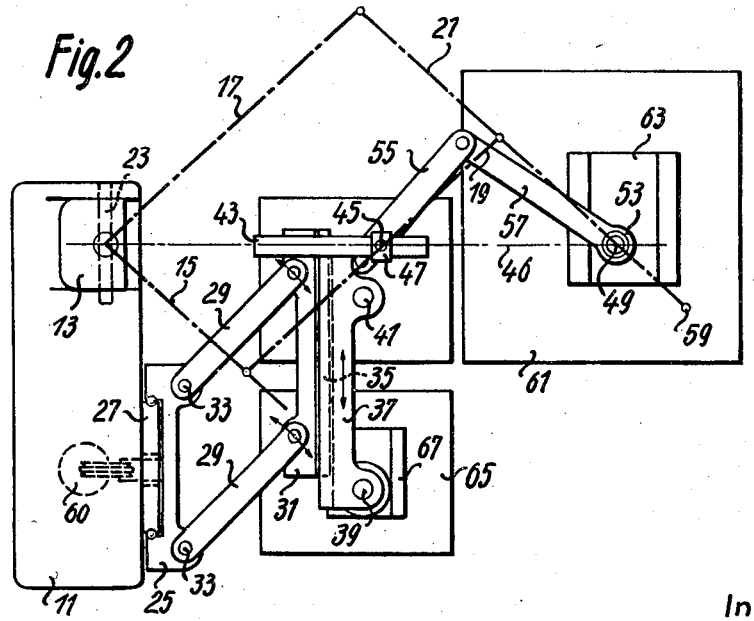

In the drawing:

Fig. 1 is a side elevation of a machine in accordance with a preferred embodiment of the invention, with parts broken away, and Fig. 2 is a top plan view thereof, with the control pantograph indicated diagrammatically by dot dash lines, for the sake of clarity.

The same reference numerals throughout the several views indicate the same parts.

The present invention is applicable to copying machines of various different types, but for the sake of a convenient illustrative example it is here shown as applied to a machine of the general type disclosed in Figs. 7 to 14, inclusive, of United States Patent 2,176,193, granted October 17, 1939, for an invention of Kurt Zwick. Insofar as details of the construction and operation of the present machine are not disclosed in the present application, such details may be the same as those disclosed in said patent.

The present machine may include, for example, a frame or standard 11 at the top of which is a support 13 mounted to oscillate about a horizontal pivot 23. Mounted on an approximately vertical pivot on this support 13 is a pantograph linkage of the lazytongs type, formed of members 15, 17, 19, and 21 pivoted to each other in the familiar manner, the ends of the member 19 being adjustable lengthwise along the members 15 and 21 in known manner.

The frame 11 is also provided with a vertical guideway 27 on which slides a member 25.

Two or more arms 29, arranged parallel to each other, are pivoted at their forward ends on vertical pivots, to the beam 31, and pivoted at their rear ends about vertical pivots 33 to the vertically movable slide 25. With this arrangement, the members 25, 29, and 31 together form what may be termed a single parallelogram linkage, so arranged that the beam 31 may swing in an arc when the arms 29 swing about their pivots 33, and all positions of this beam are parallel to each other.

The beam 31 is provided on its front face with a horizontal guideway 35, and a second beam or slide 37 is mounted to slide longitudinally along this guideway. The beam or slide 37 in turn carries any desired number of holders or sockets for receiving a cutting tool, and at least one holder or socket in which a tracing stylus may be placed. Conveniently, some or all of the sockets are so constructed as to receive interchangeably either a cutting tool or a tracing stylus. For example, the slide 37 may have a holder 39 adapted to receive the power-driven rotary spindle 40 of a cutting tool, and may have a second holder 41 adapted to receive interchangeably either a tracing stylus or a second cutting tool, and at least one of these holders may, if desired, be adjustable to various positions along the slide 37.

Mounted on the top of the slide or beam 37 is a horizontal rail 43 and likewise adjustable on the beam. A connecting number 45 adjustably mounted on the pantograph bar 19 is pivotally connected to a block 47 adjustable to various positions on the rail 43.

On the bar 21 of the pantograph linkage there is pivotally mounted at 49 a tracing stylus 51 slidable vertically through and held constantly in vertical position by a guide 53 on one end of a horizontally swingable link 57, the other end of which is pivoted on a vertical pivot to a horizontally swingable link 55 pivoted to the slide or beam 37 about a vertical pivot. The stylus assembly and the manner of guiding it while holding it vertically and while permitting free horizontal movement, are similar to the stylus holding arrangement shown in said patent. As in the patent, the guide 53 is adapted to receive a cutting tool spindle in place of the tracing stylus, when enlarged reproductions are to be made. Whenever the pantograph member 19 is shifted along the members 15 and 21 to vary the ratio of reduction or enlargement, the position of the connection 45 is also shifted along the member 19 so that this connection 45 always lies on a straight line 46 joining the stylus connection 49 with the main pivot upon which the pantograph arms 15 and 17 are mounted.

A control handle 59 is preferably adjustably attached to the pantograph bar 21 to depend therefrom in a position close to the tracing stylus 51, and is grasped by the operator for controlling and guiding the movements of the mechanism. The weight of the vertical slide 25 and all parts supported therefrom is counterbalanced by suitable spring or weight means as taught in said patent, a counterweight 60 being here shown as an example.

When the machine is used for making reproductions on a reduced scale, the pattern 63 is placed on the table 61, and the work 67 is clamped to the table 65. When the machine is to be used for enlarged scale reproductions, rather than reduced scale, then the positions of the pattern and the work are reversed. When the machine is to be used for equal scale reproductions, the pattern is clamped to a table 69 alongside of the table 65, and the tracing stylus is inserted in the holder 41, which is over such table 69. The pantograph parts 15, 17, 19, and 21 need not be used for equal scale reproductions and may be temporarily removed from the machine, although it is sometimes convenient to leave these pantograph parts in place and to use them for leverage effect in transmitting the hand movements of the operator to the stylus and cutting tool.

It is seen that the beam or slide 37 carrying the holders 39 and 41 is capable of moving in all directions with a pure movement of translation, but is held at all times against a movement of rotation. In other words, although the beam 37 may move in all directions in three-dimensional space, all positions of the beam are parallel to each other. Movements having a vertical component are accompanied by movement of the slide 25 vertically along its guideway 27. Movements of the beam 37 having a horizontal component are accomplished by moving this beam 37 horizontally along its guideway 35 on the beam 31, or by swinging the beam 31 on its supporting arms 29 about the pivots 33, or, in most cases, by a combination of these two movements. For example, if the beam 37 is to be moved in a direction perpendicular to its guideway 35 and straight rearwardly toward the machine frame 11, the arms 29 swing in a counterclockwise direction when viewed from above as in Fig. 2, so that the beam 31 moves upwardly (when viewed as in Fig. 2) and simultaneously toward the frame 11, and the beam or slide 37 simultaneously moves downwardly relatively to the beam 31, along its guideway 35, to compensate for the upward movement of the beam 31 as both beams together move toward the frame 11.

The operation of the machine in making reduced, enlarged, or equal scale reproductions in a single plane or in three-dimensional work, but it will be seen that the mechanism for guiding the beam 37 in its parallel movements is considerably simpler, less expensive, and more satisfactory than the beam-guiding arrangements disclosed in said patent. According to the present invention there is substituted a simple single-parallelogram linkage, thus reducing the weight of the linkage and also reducing the number of pivot bearings, with a considerable saving in expense. The present single-parallelogram supporting arrangement is found to be particularly satisfactory and effective.

While one embodiment of the invention has been disclosed, it is to be understood that the inventive idea may be carried out in a number of ways. This application is therefore not to be limited to the precise details described, but is intended to cover all variations and modifications thereof falling within the scope of the appended claim.

I claim:

A copying machine including a frame, a substantially vertical guideway on said frame, a mounting member mounted for upward and downward movement along said guideway, and provided at each of its ends with a lug, a pivot bolt journaled in each lug, a pair of rigid links, each link having a fork at each of its ends, the fork on one end of each link loosely embracing one of said lugs and one of said bolts transfixing the ends of the fork, a beam provided at each of its ends with a lug, a pivot bolt journaled in each of said lugs, the forks at the opposite ends of said links loosely embracing said beam lugs respectively, and said beam bolts transfixing said last mentioned forks respectively, said links forming a parallelogram with said mounting member and said beam, a substantially horizontal guideway on said beam extending substantially parallel to a line passing through the axes of the beam bolts, a slide movable along said horizontal guideway, a holder on said slide for holding a rotary cutting-tool spindle, a pantograph pivotally mounted on said frame, means for connecting a tracing stylus to said pantograph at one point thereof, and means for connecting another point of said pantograph to said slide.

KURT ZWICK.